United States Patent [19]

Prindle

[11] Patent Number: 4,936,470
[45] Date of Patent: Jun. 26, 1990

[54] CADDY

[75] Inventor: William A. Prindle, Santa Barbara, Calif.

[73] Assignee: Robinson Knife Manufacturing Co., Inc., Springville, N.Y.

[21] Appl. No.: 335,223

[22] Filed: Apr. 10, 1989

[51] Int. Cl.$^5$ ................................................. A47F 7/00
[52] U.S. Cl. ..................................... 211/70.7; 211/88; 211/104
[58] Field of Search ...................... 211/70.7, 88, 2, 85, 211/104, 35, 132, 60.1, 70.6, 71; 220/23.83, 23.4; 206/315 R; D7/73

[56] References Cited

U.S. PATENT DOCUMENTS

| | | | |
|---|---|---|---|
| D. 299,402 | 1/1989 | Ancona et al. | D7/73 |
| 2,601,357 | 6/1952 | Allbritton | 211/132 |
| 2,731,270 | 1/1956 | Schulz | 273/148 |
| 3,113,817 | 12/1963 | Imel | 312/199 |
| 3,656,727 | 4/1972 | Greenlee | 248/201 |
| 3,684,102 | 8/1972 | Colter | 211/88 |
| 4,081,101 | 3/1978 | West | 220/23.4 |
| 4,099,813 | 7/1978 | Olivan | 211/88 X |
| 4,193,495 | 3/1980 | Keeley | 206/315 R |
| 4,475,660 | 10/1984 | Cain | 211/88 X |
| 4,483,455 | 11/1984 | Prophet, Jr. et al. | 220/23.83 |

Primary Examiner—Alvin C. Chin-Shue
Assistant Examiner—Sarah A. Lechok
Attorney, Agent, or Firm—Bean, Kauffman & Spencer

[57] ABSTRACT

A caddy for storing articles, such as kitchen utensils, having first and second parts provided with pockets for receiving articles to be stored, and are connected by a hinge for swinging movement from a flatwise condition suitable for permitting hanging of the caddy on a wall, wherein the pockets are arranged side-by-side and extend in the same direction, and a folded condition suitable for permitting support of the caddy on a generally horizontally disposed support surface, wherein the pockets are arranged back-to-back and extend in opposite directions. The parts are provided with roller members arranged when the parts are in folded condition to support the caddy on the support surface for rotational movements.

14 Claims, 1 Drawing Sheet

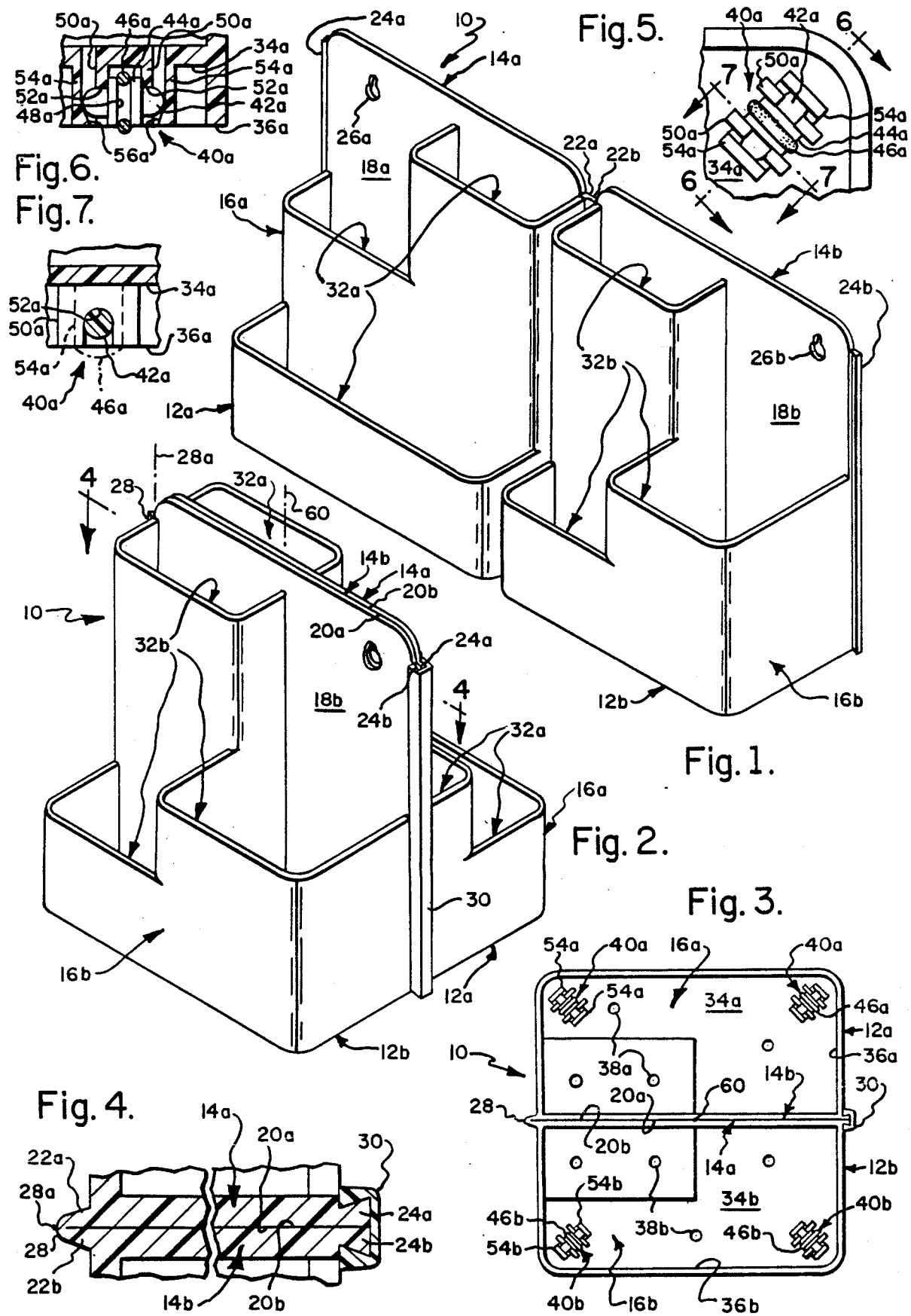

CADDY

BACKGROUND OF THE INVENTION

The present invention relates to caddies or portable units adapted for storing articles, such as kitchen utensils.

Prior caddies used for storing kitchen utensils of which I am aware are typically formed with one or more upwardly opening pockets, each sized to store one or more utensils and adapted to be either suspended from a wall, such as is shown by U.S. Pat. No. 3,684,102, or simply supported on a horizontally disposed support surface, such as is shown by U.S. Pat. No. Des. 299,402. Caddies of the latter type have also been mounted on "lazy susans" in order to allow the caddies to be rotated about a vertical axis to facilitate access to the several pockets of the caddies.

SUMMARY OF THE INVENTION

The present invention is directed to an improved article storage caddy, which is adapted for mounting on both vertical and horizontal surfaces.

More particularly, the invention relates to a caddy which can be folded from a flatwise condition, wherein article receiving pockets of the caddy are arranged side-by-side to allow for hanging of the caddy from a wall, into a folded condition, wherein the pockets are arranged back-to-back allowing for support of the caddy on a horizontal surface, such as defined by a shelf or table. The caddy is provided with roller members arranged when the caddy is in folded condition to permit the caddy to be rotated for purposes of facilitating access to the several pockets of the caddy.

BRIEF DESCRIPTION OF THE DRAWINGS

The nature and mode of operation of the present invention will now be more fully described in the following detailed description taken with the accompanying drawings wherein:

FIG. 1 is a perspective view of an article storage caddy of the present invention shown in a flatwise condition;

FIG. 2 is a perspective view of the caddy shown in a folded condition;

FIG. 3 is a bottom plan view of the caddy in a folded condition;

FIG. 4 is a fragmentary sectional view taken generally along the line 4—4 in FIG. 2;

FIG. 5 is an enlarged fragmentary view of one corner of the caddy, as viewed in FIG. 4;

FIG. 6 is a sectional view taken generally along the line 6—6 in FIG. 5; and

FIG. 7 is a sectional view taken generally along the line 7—7 in FIG. 5.

DETAILED DESCRIPTION

A caddy formed in accordance with the present invention and adapted for use in storing articles, not shown, is generally designated as 10 in FIGS. 1-3. Caddy 10 is shown as having first and second parts 12a and 12b defined by back portions 14a and 14b and front portions 16a and 16b, respectively.

Back portions 14a and 14b may be considered as having front and rear surfaces 18a and 18b and 20a and 20b, respectively, and oppositely disposed first and second edges 22a, 24a and 22b, 24b, respectively. As best shown in FIG. 1, back portions 14a and 14b are preferably provided with means, such as through openings 26a and 26b sized and shaped to receive fastener or hook devices, not shown, by which caddy 10 may be suspended or supported relative to a vertically disposed surface, such as a wall, not shown, when the caddy is disposed in its open or flatwise condition shown in this figure. As best shown in FIG. 4, first edges 22a and 22b are connected by an integrally formed, resiliently deformable hinge or strap 28, and second edges 24a and 24b are of a wedge-shaped cross-sectional design. Hinge 28 serves to connect parts 12a and 12b for swinging movement between the open or flatwise position shown in FIG. 1 and the closed or folded position shown in FIGS. 2 and 3 about a hinge axis 28a shown only in FIGS. 2 and 4, which extends lengthwise of the hinge and first edges 22a and 22b. Caddy 10 may be releasably retained in closed or folded condition by sliding a generally U-shaped latch member 30 lengthwise of second edges 24a and 24b, as shown in FIGS. 2-4.

Front portions 16a and 16b project from front surfaces 18a and 18b and, as desired, either cooperate therewith or individually to define one or more upwardly opening pockets 32a and 32b, sized to receive articles, such as kitchen utensils, to be stored. Front portions 16a and 16b are shown in FIG. 3 as having bottom surfaces 34a and 34b, which are bounded by downwardly projecting rims 36a and 36b and are provided with drain openings 38a and 38b disposed in alignment with pockets 30a and 30b.

By referring to FIG. 3, it will be noted that parts 12a and 12b are preferably provided with roller members 40a and 40b adapted for use in supporting caddy 10 relative to a generally horizontally disposed support surface, such as may be defined by a shelf or table, not shown, when the caddy is disposed in its folded condition shown in FIGS. 2 and 3. In the presently preferred construction, roller members 40a and 40b are removably snap-fit connected to front portions 16a and 16b by the arrangement best shown in FIGS. 5-7 in the case of one of roller members 40a. By referring to FIGS. 5-7, it will be noted that roller member 40a includes a generally cylindrically shaped axle portion 42a projecting in opposite directions from an integrally formed hub portion 44a and a rim portion 46a preferably in the form of a resiliently deformable O-ring received within an annular groove 48a defined by the hub portion. Roller member 40a is supported for rotation by a pair of bearing flanges 50a having aligned, downwardly opening bearing recesses 52a sized to freely journal axle portion 42a. A pair of resiliently deformable retaining flanges 54a is associated with each pair of bearing flanges 50a and serves to releasably maintain axle portion 42a seated within bearing recesses 52a, as best shown in FIG. 6. As will be apparent from viewing FIG. 6, retaining flanges 54a have free end enlargements 56a, which are normally biased into positions in which they underengage the ends of axle portion 42a for purposes of maintaining the axle portion journalled within bearing recesses 52a. End enlargements 56a may be manually forced to move away from one another when it is desired to removably insert axle portion 42a into bearing recesses 52a.

When first and second parts 12a and 12b are disposed flatwise as shown in FIG. 1, rear surfaces 20a and 20b lie in an essentially coplanar relationship with front portions 16a and 16b being disposed in a side-by-side relationship to project in the same direction away from a wall or other surface to which caddy 10 is attached with the aid of openings 26a and 26b. With caddy 10 so disposed, ready access to articles stored within each of pockets 32a and 32b is provided to a user facing the caddy.

When it is desired to support caddy 10 on a shelf or tabletop, as opposed to a wall, a user would be required to fold the caddy along the axis defined by hinge 28 until rear surfaces 20a and 20b lie in a parallel or face-to-face position shown in FIG. 2, and to then slide latch member 30 lengthwise of second edges 24a and 24b for purposes of latching or retaining the caddy in its folded condition. When caddy 10 is disposed in folded condition, front portions 16a and 16b face in opposite directions, thereby requiring the caddy to be turned for purposes of affording access to articles in both of pockets 32a and 32b. If desired, caddy 10 may be supported on a shelf or tabletop by depending rims 36a and 36b. It is preferable, however, to mount roller members 40a and 40b on caddy 10 for purposes of lifting depending rims 36a and 36b from the supporting surface, which they would otherwise engage, and facilitate manual movement of the caddy to provide ready access to stored articles. With a view towards both preventing caddy 10 from unintentionally rolling off of a supporting surface and facilitating ready access to the stored articles, roller members 40a and 40b are arranged in the orientation shown in FIG. 3 in which they cooperate to support the caddy for rotation about a vertical axis designated as 60 in FIGS. 2 and 3, which is disposed essentially centrally and vertically through the folded caddy. Specifically, this is achieved by positioning roller members 40a and 40b adjacent the outer corners of bottom surfaces 34a and 34b and arranging the rotational axes of the roller members such that they essentially intersect with the vertical axis of rotation of the caddy. With the caddy design depicted in the drawings where first and second parts 12a and 12b are of rectangular plan view configuration and sized to provide a folded caddy plan view configuration, which is essentially square, the axes of rotation of each pair of roller members 40a and 40b would intersect at right angles.

While alternate constructions are possible, the presently preferred construction contemplates that the whole of caddy 10, except for latch member 30 and roller members 40a and 40b, will be integrally mold formed from a suitable plastic material, which is resiliently deformable to an extent required to permit resilient flexures of hinge 28 and retaining flanges 54a and 54b, as described above. Roller members 40a and 40b, except for O-rings 46a and 46b, and latch member 30 may be conveniently formed from the same plastic material.

The number, shape and size of pockets 32a and 32b are matters of choice. Moreover, the term pockets, as used herein, is meant to include hooks, clamps or the like, not shown, which project from back portion 14a and 14b and are suitable for use in supporting articles to be stored.

Further, it is contemplated that one or more portions of caddy 10 may bear desired indicia adapted to enhance the aesthetic appearance and/or the functionality of the caddy. For example, the exterior surface of latch element 30 may bear indicia allowing same to be used as a ruler marked in English and/or metric units of length.

What is claimed is

1. A caddy for storing articles comprising:
   first and second parts, each of said first and second parts having a back portion having front and rear surfaces and oppositely disposed first and second edges and a front portion extending from said front surface and having at least one pocket for storing an article;
   hinge means joining said first edges of said back portions to permit swinging movement of said first and second parts between an open position in which said rear surfaces lie in an essentially coplanar relationship with said front portions being disposed in a side-by-side relationship and a closed position in which said rear surfaces lie in a facing relationship, said front portions face in opposite directions, said back portion having means for removably suspending said caddy, said front portion having means for removably supporting said caddy on a generally horizontally disposed surface; and
   latch means for releasably retaining said first and second parts in said closed position.

2. A caddy according to claim 1, wherein said latch means is a generally U-shaped member sized to removably, slidably receive said second edges of said back portions.

3. A caddy according to claim 1, wherein said means for removably supporting said caddy include roller members.

4. A caddy according to claim 3, wherein said roller members are removably snap-fit connected to said front portions.

5. A caddy according to claim 3, wherein said roller members support said caddy for rotation about an axis disposed essentially parallel to said first and second edges and extending essentially centrally through said caddy when said first and second parts are in said closed position.

6. A caddy according to claim 3, wherein said first and second parts and said hinge means are of integrally formed molded plastic construction and said roller members are snapfit connected to said front portions.

7. A caddy according to claim 6, wherein said front portions each have at least one pair of depending bearing flanges and an associated pair of resiliently deformable retaining flanges, each of said roller members includes a rim portion and an axle portion, and said retaining flanges releasably retain said axle portion in rotary bearing engagement with said bearing flanges.

8. A caddy according to claim 7, wherein said roller members support said caddy for rotation about an axis disposed essentially parallel to said first and second edges and extending essentially centrally through said caddy when said first and second parts are in said closed position.

9. A caddy according to claim 8, wherein said latch means is a generally U-shaped member sized to removably, slidably receive said second edges of said back portions.

10. A caddy for storing articles and adapted to be alternatively suspended from a wall or the like or bottom supported by a generally horizontally disposed support surface, said caddy comprising:
    an integrally formed molded plastic body having first and second parts provided with pockets for supporting articles to be stored and a hinge connecting said parts for swinging movement about a hinge axis from a flatwise condition suitable for suspension from said wall, wherein said pockets are side-by-side and extend in the same direction, and a folded condition suitable for being supported by said support surface, wherein said pockets are back-to-back and extend in opposite directions; and latch means for releasably retaining said parts in said folded condition.

11. A caddy according to claim 10, wherein each of said first and second parts carries roller members for supporting said caddy on said support surface for rotational movement about a rotational axis disposed essentially parallel to said hinge axis when said parts are in said folded condition.

12. A caddy according to claim 11, wherein each of said first and second parts carries a pair of roller members whose axes of rotation essentially intersect with said rotational axis when said parts are in said folded condition.

13. A caddy according to claim 12, wherein said first and second parts are of essentially rectangular plan view configuration, and said caddy, when said first and second parts are in said folded condition, has an essentially square plan view configuration.

14. A caddy according to claim 12, wherein said first and second parts include integrally formed flange means for removably rotatably supporting said roller members.

* * * * *